US008297374B2

(12) United States Patent
Suzuki

(10) Patent No.: US 8,297,374 B2
(45) Date of Patent: Oct. 30, 2012

(54) ROTATIONALLY DRIVEN AIR TOOL

(75) Inventor: Yasumasa Suzuki, Yamagata (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 13/208,773

(22) Filed: Aug. 12, 2011

(65) Prior Publication Data

US 2011/0297412 A1 Dec. 8, 2011

Related U.S. Application Data

(63) Continuation of application No. PCT/JP2010/052273, filed on Feb. 16, 2010.

(30) Foreign Application Priority Data

Feb. 18, 2009 (JP) ................................ 2009-034803

(51) Int. Cl.
*B23B 45/04* (2006.01)

(52) U.S. Cl. ....................................... 173/218; 173/213

(58) Field of Classification Search ........................ None
See application file for complete search history.

(56) References Cited

U.S. PATENT DOCUMENTS

| | | | | |
|---|---|---|---|---|
| 3,719,254 | A * | 3/1973 | Snider | 184/64 |
| 4,403,679 | A * | 9/1983 | Snider | 184/64 |
| 5,052,496 | A * | 10/1991 | Albert et al. | 173/29 |
| 5,314,299 | A | 5/1994 | Jacobsson | |
| 5,967,243 | A * | 10/1999 | Jacobsson | 173/216 |
| 6,109,366 | A * | 8/2000 | Jansson et al. | 173/216 |
| 7,946,354 | B2 * | 5/2011 | Elmqvist | 173/218 |
| 2003/0217854 | A1 * | 11/2003 | Hansson | 173/216 |

FOREIGN PATENT DOCUMENTS

| | | | |
|---|---|---|---|
| JP | 56-083362 | U | 7/1981 |
| JP | 06-039745 | A | 2/1994 |
| JP | 2005-329510 | A | 12/2005 |
| JP | 2007-098539 | A | 4/2007 |
| WO | WO 2008066461 | A1 * | 6/2008 |

OTHER PUBLICATIONS

International Search Report for International Application No. PCT/JP2010/052273, dated Mar. 23, 2010, 2 pages.

* cited by examiner

*Primary Examiner* — Lindsay Low
(74) *Attorney, Agent, or Firm* — Brinks Hofer Gilson & Lione

(57) ABSTRACT

A rotationally driven air tool configured to be capable of retaining a lubricant in a gear of a rotation transmitting mechanism as long as possible has an air motor (14), a rotation transmitting mechanism (18) transmitting rotational driving force from a rotational output shaft (12) of the air motor to a rotary tool member (15), e.g. an abrasive disc, and a housing (28) having a motor chamber (20), a rotation transmitting chamber (22), a partition (24) between the motor chamber and the rotation transmitting chamber, and an air blow port (72) provided to extend through the partition to blow air discharged from the air motor toward a peripheral wall surface of the rotation transmitting chamber.

1 Claim, 3 Drawing Sheets

ROTATIONALLY DRIVEN AIR TOOL

RELATED APPLICATIONS

This application is a continuation of PCT/JP2010/052273 filed on Feb. 16, 2010, which claims priority to Japanese Application No. 2009-034803 filed on Feb. 18, 2009. The entire contents of these applications are incorporated herein by reference.

BACKGROUND OF THE INVENTION

1. Field of the Invention

The present invention relates to air tools equipped with an air motor and, more particularly, to rotationally driven air tools such as an air grinder using a rotational driving force from a rotational output shaft of an air motor.

2. Description of the Related Art

In general, an air grinder has a structure in which a rotation transmitting shaft is drivably connected to a rotational drive output shaft of an air motor through bevel gears, and a rotary abrasive disc is attached to the distal end of the rotation transmitting shaft (for example, Patent Literature 1).

Patent Literature 1: Japanese Patent Application Publication No. 2007-98539

In power transmission using gears, lubricant such as grease is supplied to mutually meshed gears. In rotationally driven air tools, e.g., the above-described air grinder, lubricant undesirably scatters to the surroundings as the gears rotate because of a high rotational drive speed of the rotationally driven air tool. Therefore, the gears need to be replenished with lubricant every predetermined time period. It is, however, desirable to minimize the frequency of such lubricant replenishment. An object of the present invention is to provide a rotationally driven air tool capable of retaining a lubricant in a gear for a long period of time, in view of the above-described circumstances.

SUMMARY OF THE INVENTION

The present invention provides a rotationally driven air tool including an air motor having a rotational output shaft, a rotation transmitting mechanism having a gear rotated by rotational driving force received from the rotational output shaft to transmit the rotational driving force to a rotary tool member, and a housing having a motor chamber accommodating the air motor, a rotation transmitting chamber accommodating the rotation transmitting mechanism, a partition between the motor chamber and the rotation transmitting chamber, and an air blow port provided to extend through the partition to blow at least a part of air discharged from the air motor toward a peripheral wall surface of the rotation transmitting chamber.

In this rotationally driven air tool, high-pressure air discharged from the air motor is introduced into the power transmitting chamber through the air blow port and blown toward the peripheral wall surface of the power transmitting chamber, thereby detaching lubricant from the peripheral wall surface, to which the lubricant scattered by the rotation of the gear has adhered, and also preventing lubricant scattered from the gear from adhering to the peripheral wall surface, thus allowing lubricant scattered from the gear to return and adhere to the gear. This makes it possible to retain lubricant in the gear for a long period of time.

Specifically, the peripheral wall surface of the rotation transmitting chamber may be substantially circular cylindrical around the gear, and the air blow port may open into the rotation transmitting chamber so that air blown toward the peripheral wall surface from the air blow port swirls along the peripheral wall surface. More specifically, the air blow port may be configured to blow air in a direction substantially tangential to the peripheral wall surface around the gear. Blowing air in this way makes it possible to enhance the effect of the above-described action of air on the lubricant.

More specifically, the arrangement may be as follows. The gear is a bevel gear, which is meshed with a bevel gear attached to the rotational output shaft. A peripheral wall defining the rotation transmitting chamber is provided with an air discharge port for discharging air from the rotation transmitting chamber to the outside. Respective opening ends of the air discharge port and the air blow port that open into the rotation transmitting chamber are disposed on the peripheral wall surface so as to be displaced from each other in the axial direction of the gear. That is, the position where air is blown into the rotation transmitting chamber and the position where air is discharged from the rotation transmitting chamber are displaced from each other in the axial direction of the rotation transmitting shaft, thereby making it possible to increase the length of time that air introduced into the rotation transmitting chamber resides therein until it is discharged through the air discharge port, as compared to an arrangement in which the air blow position and the air discharge position are not displaced from each other. With this structure, it is possible to reduce the amount of lubricant discharged through the air discharge port and to increase the amount of lubricant returning to the gear.

More specifically, the gear of the rotation transmitting mechanism may be a bevel gear, which is meshed with a bevel gear attached to the rotational output shaft, and the air blow port may be configured to blow at least a part of discharged air toward an axial position of the peripheral wall surface corresponding to the position of the teeth of the bevel gear of the rotation transmitting mechanism in the axial direction of the bevel gear.

The arrangement may also be as follows. The bevel gear of the rotation transmitting mechanism has a circular cylindrical peripheral surface and a conical surface contiguously extending from the circular cylindrical peripheral surface and provided with a plurality of teeth. The peripheral wall surface of the rotation transmitting chamber is set concentrically with the circular cylindrical peripheral surface of the bevel gear. The opening ends of the air blow port and the air discharge port open on the peripheral wall surface at positions respectively corresponding to the conical surface and circular cylindrical peripheral surface of the bevel gear in the axial direction of the bevel gear.

DETAILED DESCRIPTION OF THE PREFERRED EMBODIMENTS

An embodiment of a rotationally driven air tool according to the present invention will be explained below with reference to the accompanying drawings.

Figure 1:
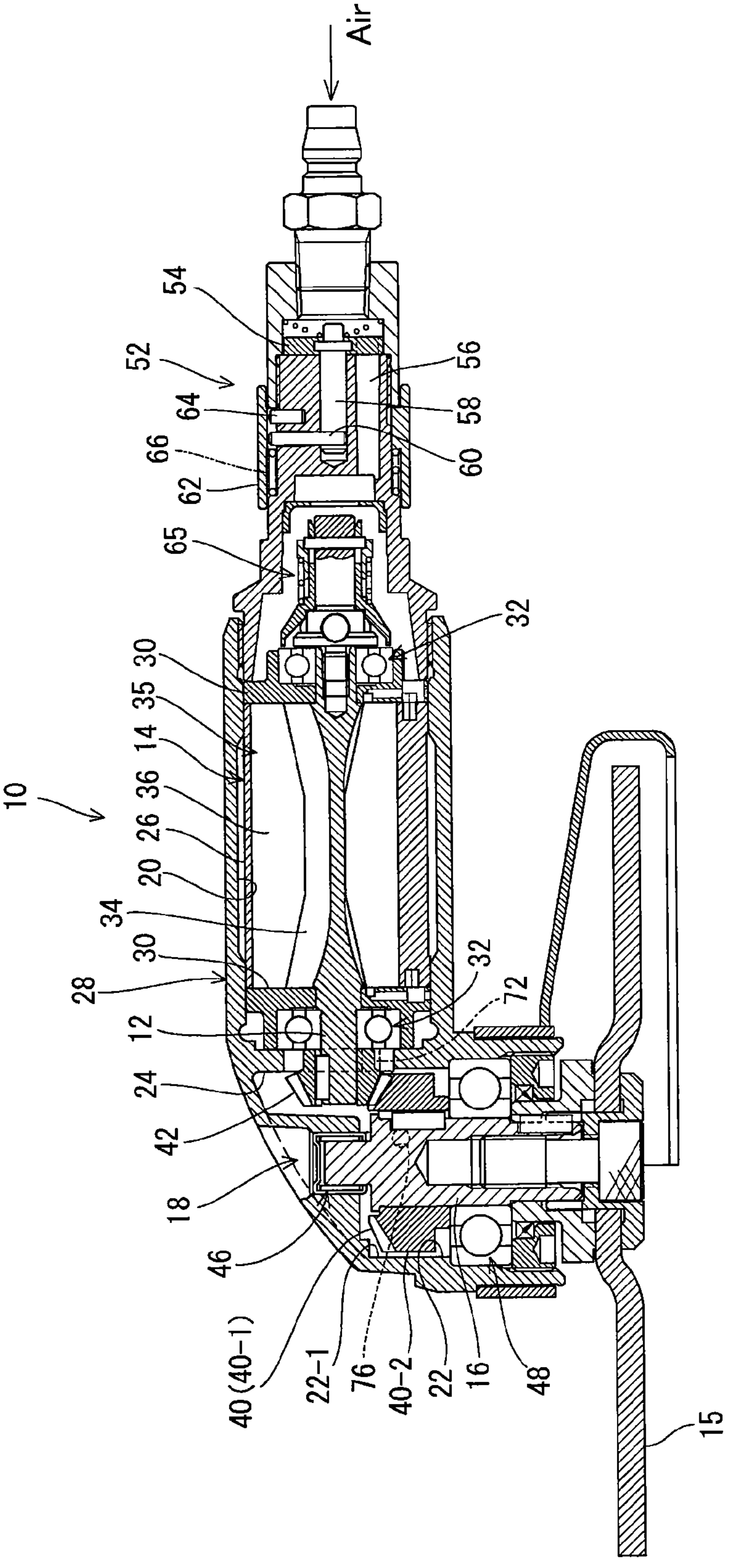
FIG. 1 is a vertical sectional view of an air grinder according to the present invention.

FIG. 1 shows an air grinder 10, which is a rotationally driven air tool according to the present invention. The air grinder 10 includes an air motor 14 having a rotational output shaft 12, a rotation transmitting mechanism 18 having a rotation transmitting shaft 16 to transmit rotational driving force from the rotational output shaft 12 to an abrasive disc (rotary tool member) 15, and a housing 28 having a motor chamber 20 accommodating the air motor 14, a rotation transmitting chamber 22 accommodating the rotation transmitting mechanism 18, and a partition 24 between the motor chamber and the rotation transmitting chamber.

The air motor 14 has a circular cylindrical casing 26 fixedly supported in the motor chamber 20 of the housing 28, end walls 30 provided at the opposite ends, respectively, of the cylindrical casing 26, and a rotor 35 formed integral with the rotational output shaft 12 and rotatably supported by radial bearings 32 provided in the end walls 30, respectively, so as to be rotatable in a rotor chamber defined by the cylindrical casing 26 and the end walls 30. As is publicly known, the rotor 35 has slits 34 provided at a predetermined spacing in the circumferential direction of the rotor 35 and each extending in the radial and axial directions. Each slit has a blade 36 provided therein displaceably in the radial direction. As the rotor rotates, the blades 36 rotate while sliding against the inner peripheral surface of the cylindrical casing 26.

The rotation transmitting shaft 16 is rotatably supported in the rotation transmitting chamber 22 by a needle bearing 46 and a radial bearing 48 and has a bevel gear 40 at the upper end thereof. The bevel gear 40 is drivably engaged with a bevel gear 42 attached to the rotational output shaft of the air motor 14.

The right end portion (as seen in FIG. 1) of the housing 28 is connected to a compressor (not shown) to introduce high-pressure air through a switching valve device 52. That is, the right end portion of the housing 28 has a plurality of circumferentially spaced air intake ports 56 (only one of them is shown in FIG. 1) extending therethrough in the lateral direction. The switching valve device 52 has a rotary valve member 54 rotatably abutting against the right end surface of the housing 28. The rotary valve member 54 is displaceable between a close position where the rotary valve member 54 closes the air intake ports 56 as shown in the figure and an open position where communicating ports (not shown) formed in the rotary valve member 54 align with the air intake ports 56 to allow the air intake ports 56 to receive high-pressure air from the air pump. The rotary valve member 54 is connected to an operating sleeve 62 through connecting shafts 58 and 60. The rotary valve member 54 is displaced between the open position and the close position by rotating the operating sleeve 62. In the figure, reference numeral 64 denotes a locking shaft engaged with the operating sleeve 62 to prevent rotation of the operating sleeve 62. When the operating sleeve 62 is to be rotated, the operating sleeve 62 is displaced leftward from the position shown in FIG. 1 against a coil spring 66 to disengage the operating sleeve 62 from the locking shaft 64.

High-pressure air introduced through the air intake ports 56 passes around a governor 65 secured to a shaft extending rightward from the rotor 35 and through a path (not shown) and is supplied into the rotor chamber to rotationally drive the rotor. Thereafter, the air is discharged into an annular space between the cylindrical casing 26 of the air motor and the housing 28 through an exhaust port (not shown) extending through the cylindrical casing 26 and further discharged to the outside through an air discharge opening 70 provided to extend through the housing 28.

Figure 2:
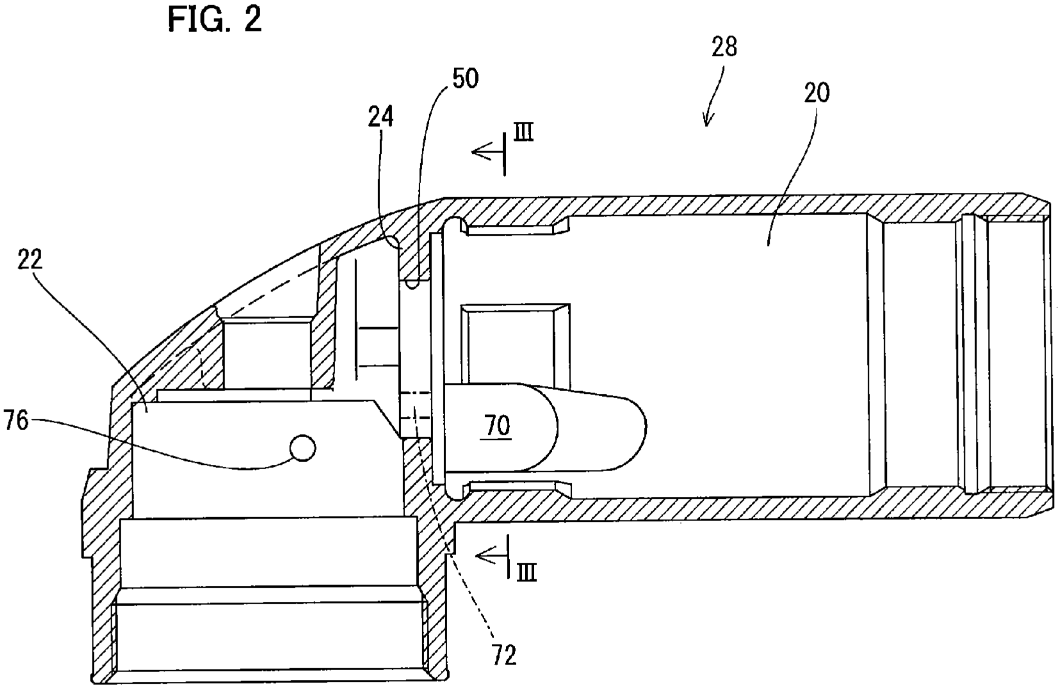
FIG. 2 is a vertical sectional view of a housing of the air grinder shown in FIG. 1, in which an air blow port is illustrated by imaginary lines to show the position thereof, although the air blow port is not really seen in this figure.
Figure 3:
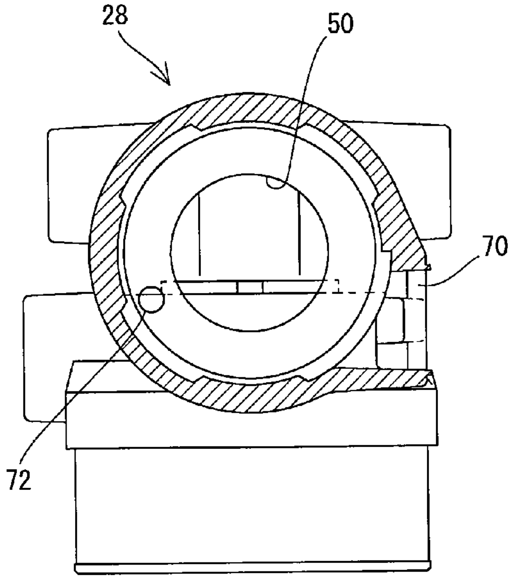
FIG. 3 is a sectional view taken along the line in FIG. 2.
Figure 4:
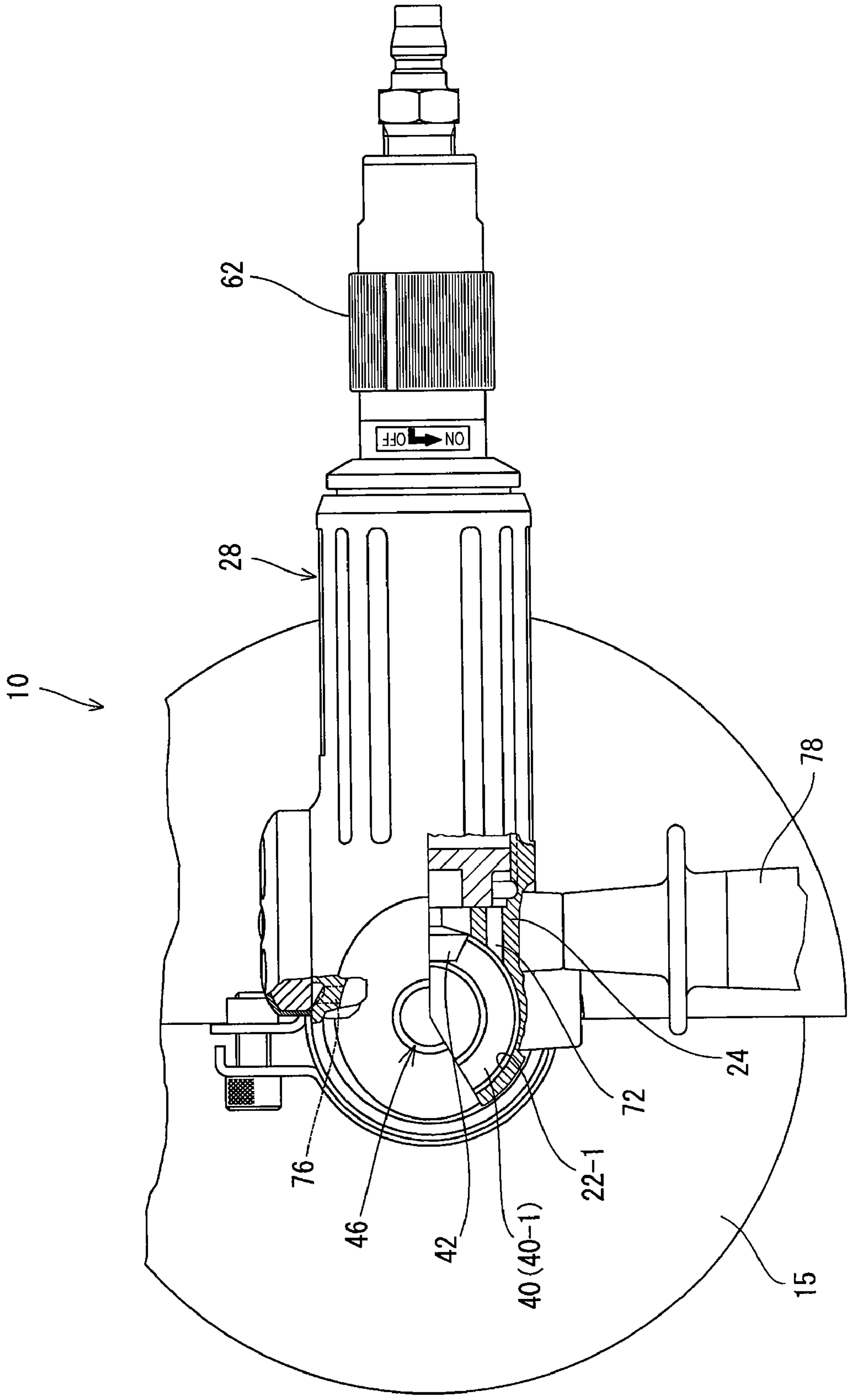
FIG. 4 is a partially-cutaway plan view of the air grinder.

FIG. 2 shows only the housing 28 of the air grinder shown in FIG. 1. FIG. 3 is a sectional view taken along the line in FIG. 2. As shown in FIG. 3, the partition 24 between the motor chamber 20 and the rotation transmitting chamber 22 is provided in the center thereof with a circular opening 50 for passing the rotational output shaft of the air motor therethrough. Thus, the partition 24 has a substantially annular configuration. The partition 24 is provided with an air blow port 72 extending therethrough to supply the rotation transmitting chamber 22 with a part of high-pressure air discharged into the annular space between the cylindrical casing 26 and the housing 28 (FIGS. 3 and 4). The air blow port 72 opens on a substantially circular cylindrical peripheral wall surface 22-1 of the rotation transmitting chamber 22 so that air blown out into the rotation transmitting chamber 22 from the air blow port 72 does not hit the bevel gear 42 but passes over an outer peripheral edge portion of an upwardly-facing conical surface 40-1 of the bevel gear 40, which is provided with a plurality of teeth, and is blown toward the peripheral wall surface 22-1 in a direction tangential thereto, thus inducing swirl flow along the peripheral wall surface. The peripheral wall of the rotation transmitting chamber 22 has an air discharge port 76 formed therein to open at a position slightly below the air blow port 72 as seen in FIG. 1 (specifically, at a position corresponding to a circular cylindrical peripheral surface 40-2 of the bevel gear contiguously extending downward from the conical surface 40-1). The air discharge port 76 is communicated with the above-described air discharge opening 70 to allow the air supplied into the rotation transmitting chamber 22 to be discharged to the outside. In the illustrated example, the air discharge port 76 is provided at a position facing the cylindrical peripheral surface 40-2 of the bevel gear 40 across a slight gap so that air supplied into the rotation transmitting chamber from the air blow port 72 swirls in a space over the conical surface of the bevel gear 40, and while doing so, the air blows off, from the surrounding housing inner peripheral wall surface, grease scattered from the bevel gear and adhering to the peripheral wall surface and also prevents grease scattered from the bevel gear from adhering to the peripheral wall surface, thereby returning the grease back to the bevel gear, and is thereafter discharged from the air discharge port 76. In FIG. 4, reference numeral 78 denotes a handle that an operator grips during work.

Although the present invention has been explained above with regard to an air grinder as one embodiment of the invention, the present invention is not limited to grinders but applicable to other rotationally driven air tools.

What is claimed is:

1. A rotationally driven air tool comprising:

an air motor having a rotational output shaft;

a rotation transmitting mechanism comprising a gear rotated by rotational driving force received from the rotational output shaft to transmit the rotational driving force to a rotary tool member; and a housing comprising a motor chamber accommodating the air motor, a rotation transmitting chamber accommodating the rotation transmitting mechanism, a partition between the motor chamber and the rotation transmitting chamber, and an air blow port provided to extend through the partition to blow at least a part of air discharged from the air motor toward a peripheral wall surface of the rotation transmitting chamber that is substantially circular cylindrical around the gear, wherein the air blow port is configured to blow air in a direction substantially tangential to the peripheral wall surface around the gear;

wherein the gear is a bevel gear, which is meshed with a bevel gear attached to the rotational output shaft, and a peripheral wall defining the rotation transmitting chamber is provided with an air discharge port for discharging air from the rotation transmitting chamber to an outside;

wherein the bevel gear of the rotation transmitting mechanism comprises a circular cylindrical peripheral surface and a conical surface contiguously extending from the circular cylindrical peripheral surface and provided with a plurality of teeth, and the peripheral wall surface of the rotation transmitting chamber is set concentrically with the circular cylindrical peripheral surface of the bevel gear, and wherein the opening ends of the air blow port and the air discharge port open on the peripheral wall surface at positions respectively corresponding to the conical surface and circular cylindrical peripheral surface of the bevel gear in the axial direction of the bevel gear.

* * * * *